United States Patent
Kawakami

(10) Patent No.: US 9,592,880 B2
(45) Date of Patent: Mar. 14, 2017

(54) BICYCLE OPERATING APPARATUS

(71) Applicant: Shimano Inc., Sakai, Osaka (JP)

(72) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 6 days.

(21) Appl. No.: 14/720,582

(22) Filed: May 22, 2015

(65) Prior Publication Data

US 2015/0344099 A1    Dec. 3, 2015

(30) Foreign Application Priority Data

May 29, 2014 (JP) ................ 2014-111033

(51) Int. Cl.
*B62K 23/06* (2006.01)
*B62M 25/04* (2006.01)
*G05G 5/24* (2006.01)

(52) U.S. Cl.
CPC ............ *B62K 23/06* (2013.01); *B62M 25/04* (2013.01); *G05G 5/24* (2013.01); *Y10T 74/20006* (2015.01); *Y10T 74/20207* (2015.01); *Y10T 74/20636* (2015.01)

(58) Field of Classification Search
CPC ..... B62M 25/04; B62M 25/045; B62K 23/06; Y10T 74/20438
See application file for complete search history.

(56) References Cited

U.S. PATENT DOCUMENTS

| 5,012,692 A * | 5/1991 | Nagano ............... B62M 25/045 192/43.1 |
| 5,044,213 A * | 9/1991 | Nagano ................ B62M 25/04 74/142 |
| 2006/0070484 A1* | 4/2006 | Kawakami ............ B62K 23/06 74/527 |

FOREIGN PATENT DOCUMENTS

JP    10-194187 A    7/1998

* cited by examiner

*Primary Examiner* — Thomas Diaz
(74) *Attorney, Agent, or Firm* — Global IP Counselors, LLP

(57) ABSTRACT

A bicycle operating apparatus is provided with a base member, a ratchet, a pawl member and an operating member. The ratchet is rotatably disposed around a ratchet axis, and biased in a first direction about the ratchet axis. The operating member moves the pawl member from a first position to a second position. The pawl member has a pawl portion and first and second support portions. The pawl portion engages with the ratchet teeth while the pawl member is in the second position to regulate rotation of the ratchet in the first direction. The first support portion pivotally supports the pawl member around a first axis as the pawl member moves from the first position to the second position. The second support portion pivotally supports the pawl member around a second axis while the pawl member is in the second position.

15 Claims, 3 Drawing Sheets

BICYCLE OPERATING APPARATUS

CROSS-REFERENCE TO RELATED APPLICATIONS

This application claims priority to Japanese Patent Application No. 2014-111033, filed on May 29, 2014. The entire disclosure of Japanese Patent Application No. 2014-111033 is hereby incorporated herein by reference.

BACKGROUND

Field of the Invention

This invention generally relates to an operating apparatus. More specifically, the present invention relates to a bicycle operating apparatus for operating a bicycle component.

Background Information

Often, a bicycle is provided with an operating apparatus for operating a bicycle component such as a gear changing device of a bicycle. A conventional operating apparatus is known that basically comprises a base member, a ratchet, a pawl member and an operating member. The ratchet has a plurality of ratchet teeth, and is rotatably provided on the base member. The ratchet is biased in a first direction around the ratchet axis. The pawl member is pivotally provided on the base member to regulate the rotation of the ratchet. The pawl member comprises a first pawl portion for positioning the ratchet by engaging with one of the plurality of ratchet teeth and a second pawl portion for regulating the rotation of the ratchet by engaging with one of the plurality of ratchet teeth in a state in which the first pawl portion is away from the ratchet. The operating member is provided on the base member for operating the pawl member and rotating a ratchet to operate the gear changing device. One example of such conventional operating apparatus is disclosed in Japanese Laid-Open Patent Publication No. 1998-194187).

In this kind of conventional operating apparatus, the engagement between the first pawl portion and the ratchet teeth is released by pivoting the operating member from an initial position to an operating position so that the ratchet rotates in the first direction. Next, the second pawl portion engages with the ratchet teeth and temporarily regulates the rotation of the ratchet in the first direction. Thereafter, when the operating member returns to the initial position, the second pawl portion will separate from the ratchet teeth; at the same time, the first pawl portion will engage with ratchet teeth that are different from before the operation, and the ratchet will rotate in the first direction by an amount of one tooth of the ratchet teeth.

SUMMARY

In the conventional operating apparatus, discussed above, the ratchet is biased in a first direction, and has the pawl member detachable from the ratchet.

According to one aspect of the present invention, a bicycle operating apparatus is provided in which the pawl member is easily detachable from the ratchet.

According to another aspect of the present invention, a bicycle operating apparatus is provided which can be configured simply, and rattling of a second pawl member can be suppressed.

In view of the state of the known technology and in accordance with a first aspect of the present disclosure, a bicycle operating apparatus is provided that comprises a base member, a ratchet, a first pawl member and a first operating member. The ratchet has at least one ratchet tooth and is rotatably disposed with respect to the base member to rotate around a ratchet axis in a first direction and in a second direction that is opposite to the first direction. The ratchet is biased in the first direction. The first pawl member is movably disposed with respect to the base member between a first position and a second position. The first operating member is operatively coupled to the first pawl member to move the first pawl member from the first position to the second position. The first pawl member comprises a pawl portion, a first support portion and a second support portion. The pawl portion is engaged with the ratchet teeth while the first pawl member is in the second position to regulate rotation of the ratchet in the first direction. The first support portion is disposed at a distance from the pawl portion and pivotally supporting the first pawl member around a first axis with respect to the base member as the first pawl member moves from the first position to the second position. The second support portion is disposed at a distance from the pawl portion and the first support portion and pivotally supporting the first pawl member around a second axis with respect to the base member while the first pawl member is in the second position.

In accordance with a second aspect of the present invention, the bicycle operating apparatus according to the first aspect is configured so that the second axis is disposed on an upstream side around the ratchet axis in the first direction with respect to the first axis.

In accordance with a third aspect of the present invention, the bicycle operating apparatus according to the second aspect is configured so that the distance between the first axis and the ratchet axis is less than the distance between the second axis and the ratchet axis.

In accordance with a fourth aspect of the present invention, the bicycle operating apparatus according to the first aspect further comprises a shaft member fixed with respect to the base member, and having the second axis. The second support portion separates from the shaft member while the first pawl member is in the first position and engages the shaft member while the first pawl member is in the second position.

In accordance with a fifth aspect of the present invention, the bicycle operating apparatus according to the fourth aspect is configured so that the shaft member further comprises a shaft main body that is fixed with respect to the base member and a roller that is rotatably provided to the shaft main body. The roller is configured to engage the second support portion.

In accordance with a sixth aspect of the present invention, the bicycle operating apparatus according to the fifth aspect is configured so that he outer shape of the roller is formed into a circular shape, and the second support portion has a recess that corresponds to the outer shape of the roller.

In accordance with a seventh aspect of the present invention, the bicycle operating apparatus according to the first aspect is configured so that the first support portion further comprises a pivoting shaft portion defining the first axis.

In accordance with an eighth aspect of the present invention, the bicycle operating apparatus according to the seventh aspect further comprises a guide member contacting the pivoting shaft portion to guide the first pawl member between the first position and the second position.

In accordance with a ninth aspect of the present invention, the bicycle operating apparatus according to the first aspect further comprises a guide member disposed on the base member to guide the first pawl member between the first position and the second position.

In accordance with a tenth aspect of the present invention, the bicycle operating apparatus according to the first aspect further comprises a first biasing member biasing the first pawl member so that the pawl portion engages the ratchet while the first pawl member is in the second position.

In accordance with an eleventh aspect of the present invention, the bicycle operating apparatus according to the first aspect is configured so that the first operating member is pivotally disposed between a first initial position and a first operating position around the ratchet axis.

In accordance with a twelfth aspect of the present invention, the bicycle operating apparatus according to the first aspect further comprises a coupling member coupling the first pawl member and the first operating member.

In accordance with a thirteenth aspect of the present invention, the bicycle operating apparatus according to the twelfth aspect is configured so that the coupling member is made of an elastic member.

In accordance with a fourteenth aspect of the present invention, the bicycle operating apparatus according to the eleventh aspect further comprises a second operating member pivotally provided between a second initial position and a second operating position around the ratchet axis, and a second pawl member pivotally provided on the second operating member to rotate the ratchet in a second direction in response to the second operating member being pivoted from the second initial position to the second operating position.

In accordance with a fifteenth aspect of the present invention, the bicycle operating apparatus according to the fourteenth aspect further comprises a second biasing member biasing the second pawl member toward the ratchet. The second pawl member engages the ratchet teeth to position the ratchet that is biased in the first direction while the second operating member is in the second initial position.

In accordance with a sixteenth aspect of the present invention, the bicycle operating apparatus according to the fifteenth aspect is configured so that the first operating member comprises an engagement portion that engages the second pawl member so that the second pawl member is separated from the ratchet teeth as pivoting from the first initial position to the first operating position.

In accordance with a seventeenth aspect of the present invention, a bicycle operating apparatus is provided that comprises a base member, a ratchet, a second operating member, a second pawl member and a second biasing member. The ratchet has at least one ratchet tooth and is rotatably disposed with respect to the base member to rotate around a ratchet axis in a first direction and in a second direction that is opposite to the first direction. The ratchet is biased in the first direction. The second operating member is operatively arranged to be operated between a second initial position and a second operating position. The second pawl member is pivotally provided on the second operating member to rotate the ratchet in the second direction in response to operation of the second operating member from the second initial position to the second operating position. The second biasing member biases the second pawl member toward the ratchet. The second pawl member engages the ratchet teeth to position the ratchet that is biased in the first direction while the second operating member is in the second initial position.

In accordance with an eighteenth aspect of the present invention, the bicycle operating apparatus according to the seventeenth aspect is configured so that the second operating member is pivotally disposed between a second initial position and a second operating position around the ratchet axis.

Also other objects, features, aspects and advantages of the disclosed bicycle operating apparatus will become apparent to those skilled in the art from the following detailed description, which, taken in conjunction with the annexed drawings, discloses one embodiment of the bicycle operating apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
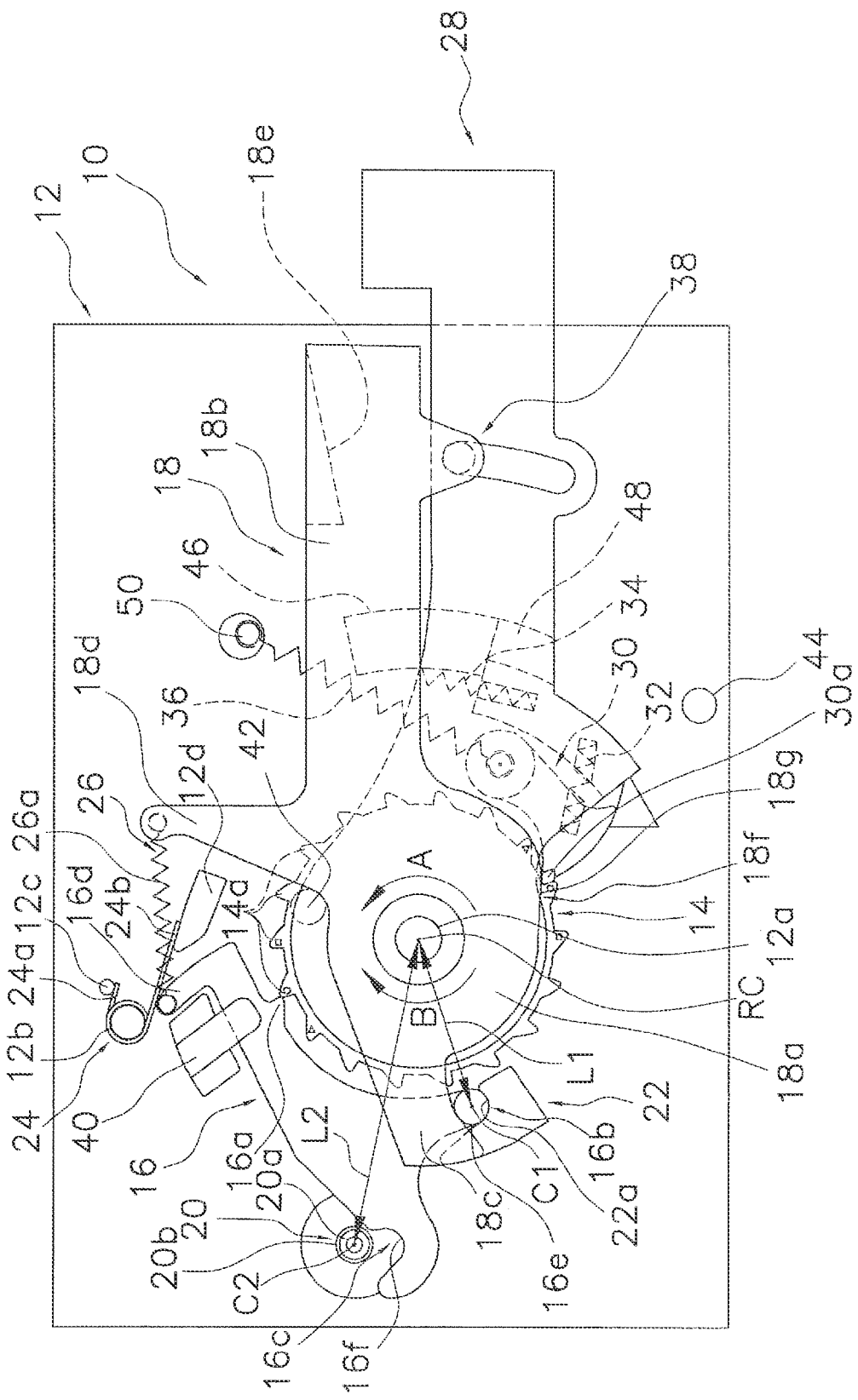
FIG. 1 is a schematic plan view of an initial position of a bicycle operating apparatus in accordance with one illustrated embodiment.

Referring initially to FIG. 1, a bicycle 10 is illustrated that is equipped with a bicycle operating apparatus 12 in accordance with a first embodiment.

The bicycle operating apparatus 10 is configured to operate a gear changing apparatus with a control cable that is not shown. The operating apparatus 10 comprises a base member 12, a ratchet 14, a first pawl member 16 and a first operating member 18. The operating apparatus 10 also comprises a shaft member 20, a guide member 22, a first biasing member 24, a coupling member 26, a second operating member 28, a second pawl member 30 and a second biasing member 32. Additionally, the operating apparatus 10 comprises a third biasing member 34 and a fourth biasing member 36.

The base member 12 configured to be attached to a bicycle. The base member 12 configured to be attached to, for example, the handlebars of a bicycle. The base member 12 comprises a rotating shaft 12a that rotatably supports the ratchet 14. The rotating shaft 12a has a ratchet axis RC.

The ratchet 14 is disposed, for example, on the base member 12. The ratchet 14 comprises at least one ratchet tooth 14a. In the present embodiment, several ratchet teeth 14a (for example, 18) are disposed at intervals in the circumferential direction. The ratchet teeth 14a are formed, for example, protruding in a nearly right triangular sawtoothed shape. The ratchet 14 is mounted to the rotating shaft 12a and is provided rotatably around a ratchet axis RC in a first direction A and in a second direction B, which is opposite of the first direction A, with respect to the base member 12. The ratchet 14 is biased in the first direction A (counterclockwise in FIG. 1) by a biasing member that is not shown (for example, a torsion coil spring). A winding body that is not shown and that can wind the control cable is integrally and rotatably provided to the ratchet 14.

The first pawl member 16 is disposed on the outer peripheral side of the ratchet teeth 14a of the ratchet 14 in order to oppose the ratchet teeth 14a. The first pawl member 16 has a nearly curved shape along the ratchet 14. The first pawl member 16 is movably provided with respect to the base member 12 between a first position shown in FIG. 1 and a second position shown in FIGS. 2 and 3. The first pawl member 16 comprises a pawl portion 16a, a first support portion 16b, a second support portion 16c and a first spring hooking portion 16d. The pawl portion 16a engages with the ratchet teeth 14a when the first pawl member 16 is in the second position to regulate rotation of the ratchet 14 in the first direction A. The pawl portion 16a is provided protruding in a nearly right triangular saw-toothed shape further toward the ratchet 14 than the other portions of the first pawl member 16. The lifting of the first pawl member 16 in a direction away from the base member 12 is regulated by a lifting prevention portion 40 that is provided to the base member 12 in the vicinity of the pawl portion 16a. The lifting prevention portion 40 is provided to the base member 12 in the vicinity of the pawl portion 16a.

The first support portion 16b is disposed on one end on a downstream side of the first pawl member 16 in the first direction A. The first support portion 16b is provided apart from the pawl portion 16a and also is provided to pivotally support the first pawl member 16 around a first axis C1 with respect to the base member 12 when the first pawl member 16 moves from the first position to the second position. The first support portion 16b comprises a pivoting shaft portion 16e having a first axis C1 for pivotally guiding the first pawl member 16 when the first pawl member 16 moves from the first position to the second position.

The second support portion 16c is provided away from the pawl portion 16a and the first support portion 16b. In the present embodiment, the second support portion 16c is disposed further away from the ratchet 14 than the first support portion 16b between the first support portion 16b and the pawl portion 16a. The second support portion 16c is provided to pivotally support the first pawl member 16 around the second axis C2 with respect to the base member 12 when the first pawl member 16 is in the second position. The second support portion 16c separates from the shaft member 20 when the first pawl member 16 is in the first position and engages with the shaft member 20 when the first pawl member 16 is in the second position. The second axis C2 is disposed on the upstream side around the ratchet axis RC in the first direction A with respect to the first axis C1. A first distance L1 between the first axis C1 and the ratchet axis RC is less than a second distance L2 between the second axis C2 and the ratchet axis RC. The second support portion 16c comprises a recess 16f that is recessed in a semicircular shape corresponding to the outer shape of a roller 20b of the shaft member 20 mentioned below.

The first spring hooking portion 16d is formed to extend in a direction away from the ratchet 14 at a second end of the first pawl member 16 on the opposite side of the first end. The coupling member 26 is coupled with the first spring hooking portion 16d. Additionally, the first spring hooking portion 16d is positioned by a second spring hooking portion 12d that locks the first biasing member 24 when the first pawl member 16 is disposed in the second position (refer to FIG. 2).

The first operating member 18 is disposed sandwiching the second operating member 28 between the first operating member 18 and the ratchet 14 in the direction that is orthogonal to the surface of FIG. 1. Therefore, in the present embodiment, the base member 12, the ratchet 14, the second operating member 28, and the first operating member 18 are arranged in that order in the direction that is orthogonal to the surface.

The first operating member 18 is provided to turn the ratchet 14 in the first direction (the release direction) A that unreels the control cable from the winding body. The operation of the operating apparatus 10 by the first operating member 18 is called a releasing operation. The first operating member 18 moves the first pawl member 16 in between the first position and the second position. The first operating member 18 is mounted to the rotating shaft 12a and is pivotally disposed around the ratchet axis RC. The first operating member 18 is pivotally provided in between the first initial position shown in FIG. 1 and the first operating position shown in FIG. 3. The first operating member 18 comprises a first mounting portion 18a that is mounted to the rotating shaft 12a, a first operating arm 18b, a pawl movement arm 18c, and a pawl connecting arm 18d. The first operating arm 18b extends radially outward from the first mounting portion 18a. The pawl movement arm 18c extends radially outward from the first mounting portion 18a on the opposite side of the first operating arm 18b. The pawl connecting arm 18d extends between the first operating arm 18b and the pawl movement arm 18c to oppose the first spring hooking portion 16d of the first pawl member 16. The pawl movement arm 18c is disposed to make contact with the pivoting shaft portion 16e. The pawl movement arm 18c is provided to return the first pawl member 16 from the second position to the first position by pressing the pivoting shaft portion 16e against the biasing force of the coupling member 26 when the first operating member 18 returns from the first operating position to the first initial position. The first operating member 18 is biased in a direction away from the second operating member 28 by a third biasing member 34 that is disposed between the first operating member and the second operating member 28.

The first operating member 18 is positioned to the first initial position by a first stopper 42 that is provided on a cover member that is not shown, which is provided opposing the base member 12. When the first operating member 18 is disposed in the first initial position, the first pawl member 16 is disposed in the first position. At this time, the rotation of the ratchet 14 in the first direction A is not regulated by the pawl portion 16a. The first operating member 18 is disposed overlapping the second operating member 28 in the first operating position shown in FIG. 3 in the direction that is orthogonal to the surface. When the first operating member 18 is disposed in the first operating position, this member has a positioning projection 18e that can make contact with the second operating member 28 on the surface on the base member 12 side. With this positioning protrusion 18e making contact with the side surface of the second operating member 28, the first operating member 18 is positioned to the first operating position.

The first operating member 18 comprises an engagement portion 18f that engages with the second pawl member 30 so that the second pawl member 30 is separated from the ratchet teeth 14a when pivoting from the first initial position to the first operating position. The engagement portion 18f is configured by a cam surface 18g that is configured so that, when the first operating member 18 pivots from the first initial position shown in FIG. 1 to the first operating position shown in FIG. 3, the distance from the ratchet axis RC gradually increases. When the first operating member 18 is operated to the first operating position, the cam surface 18g makes contact with the distal end portion of the second pawl member 30 and separates the second pawl member 30 from the ratchet teeth 14a. With this, the ratchet 14 that is biased in the first direction A by a biasing member that is not shown rotates in the first direction A.

The shaft member 20 comprises a shaft main body 20a, which is fixed with respect to the base member 12 and has a second axis C2, and a roller 20b, which is provided rotatably with respect to the shaft main body 20a. The roller 20b is provided to be able to engage with the second support portion 16c. The outer shape of the roller 20b is firmed in a circular shape; when the first pawl member 16 is in the second position, this member can engage with the recess 16f of the second support portion 16c.

The guide member 22 is provided to the base member 12 in order to guide the first pawl member 16 between the first position and the second position. More specifically, the guide member 22 makes contact with the pivoting shaft portion 16e in order to guide the first pawl member 16 between the first position and the second position. The guide member 22 comprises a circular arc-shaped guide recess 22a with the first axis C1 as the center and a guide protrusion 22b that is connected to the guide recess 22a and that guides the pivoting shaft portion 16e. The guide protrusion 22b is formed protruding from the guide recess 22a on the side with the shaft member 20. The pivoting shaft portion 16e makes contact with the side surface of this guide recess 22a on the side with the ratchet 14, and the first pawl member 16 is guided by the guide member 22 between the first position and the second position.

Figure 2:
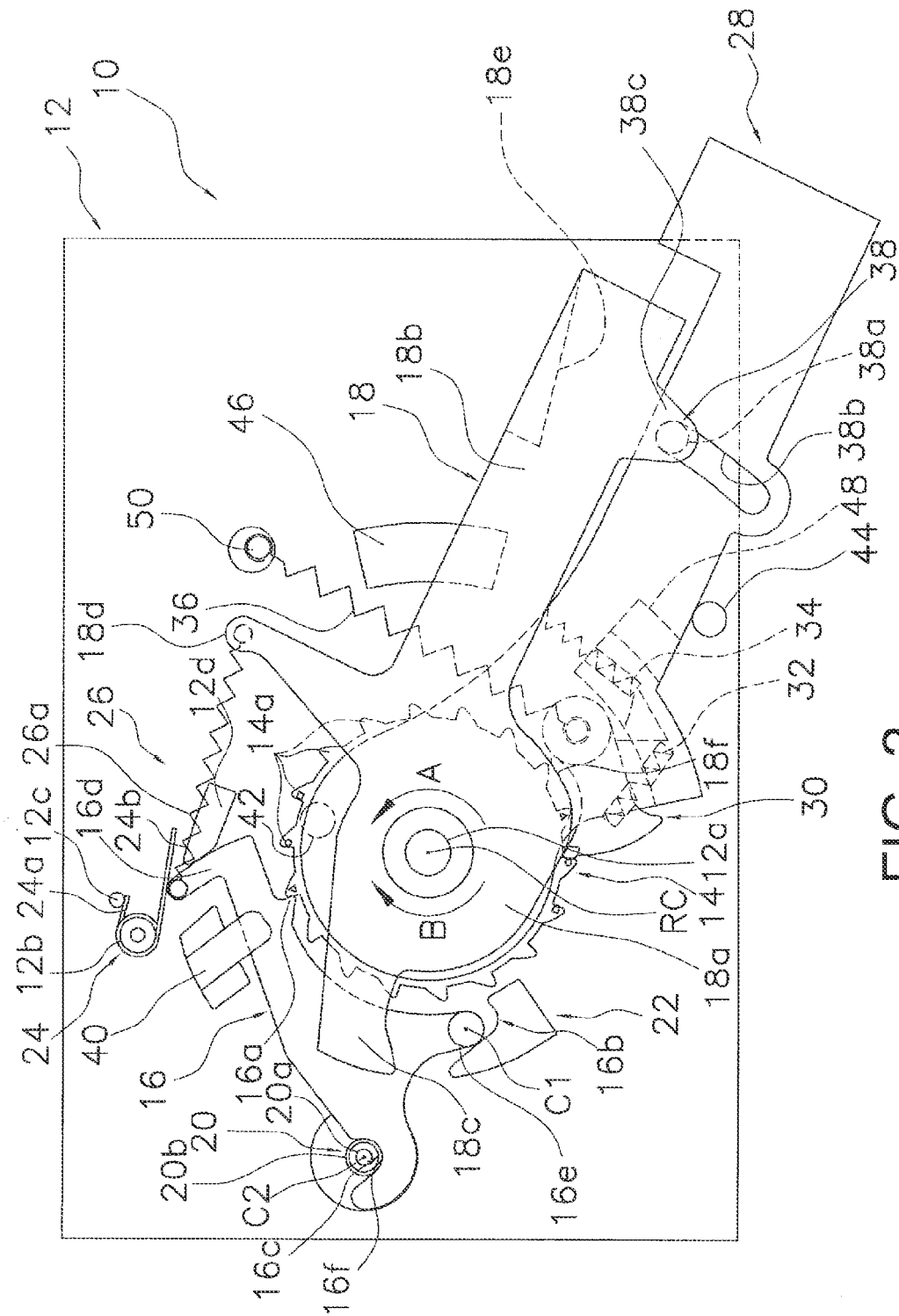
FIG. 2 is a diagram showing a feeding operation of the operating apparatus corresponding to FIG. 1.

The first biasing member 24 biases the first pawl member 16 so that the pawl portion 16a engages with the ratchet 14 when the first pawl member 16 is in the second position shown in FIG. 2. The first biasing member 24 is attached to the base member 12 in order to press the first spring hooking portion 16d of the first pawl member 16. The first biasing member 24 is configured to include a torsion coil spring that is attached to a spring mounting shaft 12b that is provided to the base member 12. A first end 24a of the first biasing member 24 is locked by a first spring locking portion 12c that is provided to the base member 12. A second end 24b of the first biasing member 24 is locked by a second spring locking portion 12d that is provided to the base member 12 in a position that is closer to the ratchet 14 than the first spring locking portion 12c. The first biasing member 24 biases the first pawl member 16 in order to make contact with the first spring hooking portion 16d of the first pawl member 16 on the second end 24b side so that the pawl portion 16a engages with the ratchet 14 when the first pawl member 16 is in the second position. When the first pawl member 16 is in the first position, the second end 24b of the first biasing member 24 is locked by the second spring locking portion 12d, so that the first biasing member 24 will not bias the first pawl member 16.

The coupling member 26 is provided to move the first pawl member 16 from the first position to the second position in response to the pivoting of the first operating member 18 from the first initial position to the first operating position. The coupling member 26 couples the first pawl member 16 and the first operating member 18. The coupling member 26 is made of an elastic member 26a. In the present embodiment, the elastic member 26a includes a coil spring. The two ends of the elastic member 26a are hooked in a stretched state to the first spring hooking portion 16d of the first pawl member 16 and the distal end of the pawl connecting arm 18d of the first operating member 18.

When the first operating member 18 is pivoted from the first initial position to the first operating position, the coupling member 26 pulls the first pawl member 16. With this, the first pawl member 16 moves from a first position in which this member does not engage with the ratchet teeth 14a to the second position in which this member does engage with the ratchet teeth 14a. Additionally, when the first operating member 18 returns from the first operating position to the first initial position, the spring force becomes weak, and the tensile force becomes weak. The first operating member 18 is biased toward the first initial position by the third biasing member 34 and the fourth biasing member 36.

As described above, the second operating member 28 is disposed between the first operating member 18 and the ratchet 14 in the direction that is orthogonal to the surface of FIG. 1. The second operating member 28 is provided to turn the ratchet 14 in a second direction (the feed direction) B that winds the control cable to the winding body. The operation of the operating apparatus 10 by the second operating member 28 is called the feeding operation. The second operating member 28 is mounted to the rotating shaft 12a and is provided to be able to be pivoted around the ratchet axis RC. The second operating member 28 is pivotally provided between the second initial position shown in FIG. 1 and the second operating position shown in FIG. 2.

An interlocking mechanism 38 is provided between the second operating member 28 and the first operating member 18. The interlocking mechanism 38 is provided to pivot the first operating member 18 from the first initial position to the interlocking position shown in FIG. 2 when the second operating member 28 pivots from the second initial position to the second operating position. The interlocking position is farther from the first initial position than the first operating position shown in FIG. 3. The interlocking mechanism 38 comprises a shaft portion 38a and a groove 38b. The shaft portion 38a is provided to a bracket 38c that protrudes in a chevron shape in order to overlap the second operating member 28 from the end surface of the first operating member 18 on the second operating member 28 side, so that this protrudes toward the second operating member 28. The groove 38b is formed so that the second operating member 28 engages with the shaft portion 38a. The groove 38b is formed to curve in a circular arc shape with the ratchet axis RC as the center. The groove width of the groove 38b is slightly larger than the diameter of the shaft portion 38a. The shaft portion 38a is disposed to an end portion of the groove 38b that is close to the first operating member 18 when the second operating member 28 is disposed in the second initial position. Therefore, when the second operating member 28 is operated from the second initial position toward the second operating position, the first operating member 18 pivots in conjunction with the second operating member 28. Additionally, in the case that the first operating member 18 pivots from the first initial position to the first operating position shown in FIG. 3, the second operating member 28 is not pivoted.

The second operating member 28 is positioned in the second operating position by a second stopper 44 that is provided to protrude from the base member 12. The second operating member 28 is positioned to the second initial position by a third stopper 46 that is formed on the base member 12 in order to curve in a circular arc shape with the ratchet axis RC as the center. A positioning member 48 that can make contact with the third stopper 46 is provided on the base member 12 side surface of the first operating member 18.

The third biasing member 34 is provided between the first operating member 18 and the second operating member 28. The third biasing member 34 includes, for example, a coil spring that is disposed in a compressed state. The second operating member 28 is biased toward the second initial position by the fourth biasing member 36. The fourth biasing member 36 includes, for example, a coil spring that is disposed in a stretched state. One end of the fourth biasing member 36 is locked by a second spring hooking portion 50 that is provided to the base member 12, and the other end is locked by an attaching portion of the second pawl member 30 that is provided to the second operating member 28.

The second pawl member 30 is pivotally provided to the second operating member 28. The second pawl member 30 rotates the ratchet 14 in the second direction B accompanying the pivoting of the second operating member 28 from the second initial position to the second operating position. The second pawl member 30 comprises a pressing portion 30a that can press the ratchet teeth 14a in the second direction B at the distal end. The pressing portion 30a engages with the ratchet 14a and also engages with the cam surface 18g of the engagement portion 18f that is provided to the first operating member 18. The pressing portion 30 is formed to be thicker than the other portions of the second pawl member 30 in order to engage with the ratchet teeth 14a and the cam surface 18g. The second pawl member 30 is biased toward the ratchet 14 by the second biasing member 32. One end of the second biasing member 32 is locked by the second operating member 28, and the other end is locked by the second pawl member 30; this member is disposed in a compressed state. The second pawl member 30 engages with the ratchet teeth 14a to position the ratchet 14 that is biased in the first direction A when the first operating member 18 is in the first initial position and when the second operating member 28 is in the second initial position. Therefore, in the present embodiment, the second operating member 28 conducts the feeding operation of the ratchet 14 and positions the ratchet 14.

Operation of the Operating Apparatus

Next, the releasing operation by the first operating member 18 will be explained. As shown in FIG. 1, when neither the first operating member 18 nor the second operating member 28 is operated, the first pawl member 16 is supported around the first axis C1 by the first support portion 16b with respect to the base member 12. Additionally, since the first pawl member 16 is pulled by the elastic member 26a and is biased in a direction away from the ratchet teeth 14a, this member is disposed in the first position in which there is no engagement with the ratchet teeth 14a. Meanwhile, the second pawl member 30 engages with the ratchet teeth 14a and positions the ratchet 14.

Figure 3:
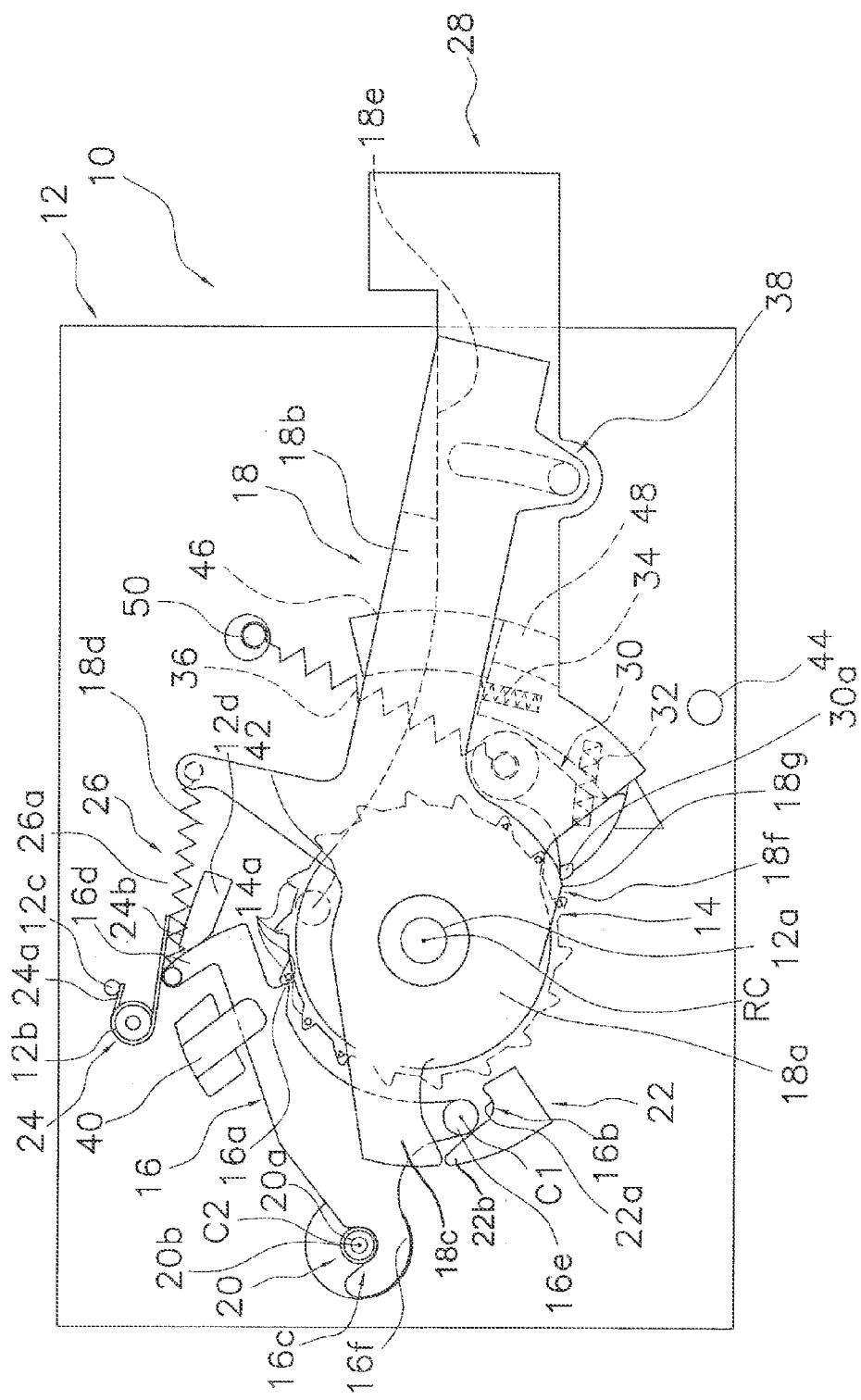
FIG. 3 is a diagram showing a return operation of the operating apparatus corresponding to FIG. 1.

When the first operating member 18 is operated from the first initial position shown in FIG. 1 to the first operating position shown in FIG. 3, the engagement portion 18f of the first operating member 18 presses the pressing portion 30a of the second pawl member 30 in a direction in which the second pawl member 30 is detached from the ratchet teeth 14a. With this, the positioning of the ratchet 14 by the second pawl member 30 is released, and the ratchet 14 that is biased in the first direction A will rotate. However, when the first operating member 18 is operated to the first initial position, the first pawl member 16 is pulled by the elastic member 26a and, as shown in FIG. 3, will move to the second position in which there is support from the second support portion 16c. As a result, the rotation of the ratchet 14 in the first direction A will temporarily stop. Then, if a hand is taken off of the first operating member 18, the first operating member 18 will be biased toward the first initial position by the third biasing member 34, and the first operating member 18 will pivot toward the first initial position to be positioned to the first initial position by the first stopper 42.

When the first operating member 18 returns to the first initial position, the second pawl member 30 is in an state that can engage with the ratchet teeth 14a, and the first pawl member 16 is disposed in the first position. Then, the first pawl member 16 is detached from the ratchet teeth 14a, and the ratchet 14 will rotate slightly in the first direction A into a position in which the second pawl member 30 will position this member. With this, the ratchet 14 is positioned one step on the release side, and the releasing operation is ended.

When the first operating member 18 returns to the first initial position, the pivot center of the first pawl member 16 returns from the second axis C2 to the first axis C1. This second axis C2 is farther on the upstream side than the first axis C1 in the first direction A and is farther away from the ratchet axis RC; therefore, when returning from the second position to the first position, the first pawl member 16 becomes more easily detachable from the ratchet teeth 14a.

Next, the feeding operation of the second operating member 28 will be explained.

When the second operating member 28 is operated from the second initial position shown in FIG. 1 to a third operating position shown in FIG. 3, the pressing portion 30a of the second pawl member 30 will press the ratchet teeth 14a and will rotate the ratchet 14 in the second direction B. At this time, the first operating member 18 is pivoted beyond the first operating position along with the second operating member 28 by the interlocking mechanism 38. When the second operating member 28 is pivoted to the second operating position, the ratchet 14 will be rotated to the position shown in FIG. 3. Specifically, the second operating member 28 will rotate the ratchet 14 from the position shown in FIG. 1 to a position in which the pawl portion 16a of the first pawl member 16 will engage with the ratchet teeth 14a (for example, the ratchet teeth shown by the triangle mark in FIG. 1) that are farther on the upstream side in the second direction B than the ratchet teeth 14a (for example, the ratchet teeth with the circle mark in the vicinity of the first pawl member 16 in FIG. 1) corresponding to the ratchet teeth 14a currently conducting positioning (for example, the ratchet teeth with the circle mark in FIG. 1). This state is shown in FIG. 3. With this, the ratchet 14 is temporarily positioned.

When a hand is taken off of the second operating member 28, the second operating member 28 will be biased toward the second initial position by the fourth biasing member 36 and will be positioned by a third stopper 46 to the second initial position, abutting a positioning member 48. When the second operating member 28 returns from the second operating position to the second initial position, the first operating member 18 will also return to the first initial position. For this reason, the first pawl member that is disposed to the first position will return to the second position. At this time, at the point at which the second pawl member 30 goes beyond the ratchet teeth 14a of the triangle mark, the temporary positioning of the pawl portion 1 6a of the first pawl member 16 is released, and the ratchet teeth 14a of the ratchet 14 shown by the triangle mark will be positioned by the second pawl member 30. That is, the ratchet 14 is positioned to the ratchet teeth 14a on the upstream side in the first direction A of the ratchet teeth 14a with the circle mark in FIG. 1. With this, the ratchet 14 is positioned one step on the feed side, and the feeding operation ends. Here, since the feeding operation of the ratchet 14 in the second direction B and the positioning of the ratchet 14 can be done by the second pawl member 30, the configuration of the operating apparatus 10 becomes simple, and the rattling of the second pawl member 30 can be suppressed.

Other Embodiments

One embodiment of the present invention was described above, but the present invention is not limited to the above-described embodiment; various modifications can be made without departing from the scope of the invention. In particular, the various embodiments and modified examples described in the present Specification can be freely combined according to necessity.

(a) In the above-described embodiment, the ratchet 14 was disposed on the base member 12 between the first operating member 18 and the second operating member 28; however, the present invention is not limited to this, and the arrangement order of each part can be freely set.

(b) In the above-described embodiment, the first support portion 16b was configured by a shaft portion (a pivoting shaft portion 16e), and the second support portion 16c was configured by a recess 16f; however, these portions can be reversed, or they can both configure a recess or a shaft portion.

(c) In the above-described embodiment, the first operating member and the second operating member were disposed so that they can pivot around the ratchet axis RC, but the present invention is not limited to this. The first operating member can be disposed pivotally around an axis that is different from the ratchet axis RC.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating apparatus. Accordingly, these directional terms, as utilized to describe the bicycle operating apparatus should be interpreted relative to a bicycle in an upright riding position on a horizontal surface and that is equipped with the bicycle operating apparatus. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating apparatus comprising:
 a base member;
 a ratchet having at least one ratchet tooth and being rotatably disposed with respect to the base member to rotate around a ratchet axis in a first direction and in a second direction that is opposite to the first direction, and the ratchet being biased in the first direction;
 a first pawl member movably disposed with respect to the base member between a first position and a second position;
 a first operating member operatively coupled to the first pawl member to move the first pawl member from the first position to the second position,
 the first pawl member comprises
  a pawl portion engaged with the at least one ratchet tooth while the first pawl member is in the second position to regulate rotation of the ratchet in the first direction,
  a first support portion disposed at a distance from the pawl portion and pivotally supporting the first pawl member around a first axis with respect to the base member as the first pawl member moves from the first position to the second position, and
  a second support portion disposed at a distance from the pawl portion and the first support portion and pivotally supporting the first pawl member around a second axis with respect to the base member while the first pawl member is in the second position;

a shaft member fixed with respect to the base member, and having the second axis, the second support portion separating from the shaft member while the first pawl member is in the first position and engaging the shaft member while the first pawl member is in the second position.

2. The operating apparatus as recited in claim 1, wherein the second axis is disposed on an upstream side around the ratchet axis in the first direction with respect to the first axis.

3. The operating apparatus as recited in claim 2, wherein the distance between the first axis and the ratchet axis is less than the distance between the second axis and the ratchet axis.

4. The operating apparatus as recited in claim 1, wherein the shaft member thither comprises a shaft main body that is fixed with respect to the base member and a roller that is rotatably provided to the shaft main body, the roller being configured to engage the second support portion.

5. The operating apparatus as recited in claim 4, wherein the outer shape of the roller is formed into a circular shape, and the second support portion has a recess that corresponds to the outer shape of the roller.

6. The operating apparatus as recited in claim 1, wherein the first support portion further comprises a pivoting shaft portion defining the first axis.

7. The bicycle operating apparatus as recited in claim 6, further comprising a guide member contacting the pivoting shaft portion to guide the first pawl member between the first position and the second position.

8. The operating apparatus as recited in claim 1, further comprising a guide member disposed on the base member to guide the first pawl member between the first position and the second position.

9. The operating apparatus as recited in any one of claim 1, further comprising a first biasing member biasing the first pawl member so that the pawl portion engages the ratchet while the first pawl member is in the second position.

10. The operating apparatus as recited in claim 1, wherein the first operating member is pivotally disposed between a first initial position and a first operating position around the ratchet axis.

11. The operating apparatus as recited in claim 1, further comprising a coupling member coupling the first pawl member and the first operating member.

12. A bicycle operating apparatus comprising:

a base member;

a ratchet having at least one ratchet tooth and being rotatably disposed with respect to the base member to rotate around a ratchet axis in a first direction and in a second direction that is opposite to the first direction, and the ratchet being biased in the first direction;

a first pawl member movably disposed with respect to the base member between a first position and a second position;

a first operating member operatively coupled to the first pawl member to move the first pawl member from the first position to the second position, the first pawl member comprises a pawl portion engaged with the at least one ratchet tooth while the first pawl member is in the second position to regulate rotation of the ratchet in the first direction, a first support portion disposed at a distance from the pawl portion and pivotally supporting the first pawl member around a first axis with respect to the base member as the first pawl member moves from the first position to the second position, and a second support portion disposed at a distance from the pawl portion and the first support portion and pivotally supporting the first pawl member around a second axis with respect to the base member while the first pawl member is in the second position; and a coupling member coupling the first pawl member and the first operating member;

the coupling member is made of an elastic member.

13. The operating apparatus as recited in claim 10, further comprising a second operating member pivotally provided between a second initial position and a second operating position around the ratchet axis, and a second pawl member pivotally provided on the second operating member to rotate the ratchet in a second direction in response to the second operating member being pivoted from the second initial position to the second operating position.

14. The operating apparatus as recited in claim 13, further comprising a second biasing member biasing the second pawl member toward the ratchet, the second pawl member engaging the at least one ratchet tooth to position the ratchet while the second operating member is in the second initial position.

15. The operating apparatus as recited in claim 14, wherein the first operating member comprises an engagement portion that engages the second pawl member so that the second pawl member is separated from the at least one ratchet tooth as pivoting from the first initial position to the first operating position.

* * * * *